United States Patent
Cloud et al.

(10) Patent No.: US 6,196,104 B1
(45) Date of Patent: Mar. 6, 2001

(54) APPARATUS FOR PRODUCING SHEETS OF SOLID SURFACING

(75) Inventors: Frank Bell Cloud, Temple, TX (US); Robert Edward Respess, Mobile, AL (US)

(73) Assignee: Premark RWP Holdings, Inc., Wilmington, DE (US)

(*) Notice: Subject to any disclaimer, the term of this patent is extended or adjusted under 35 U.S.C. 154(b) by 0 days.

(21) Appl. No.: 09/065,801

(22) Filed: Apr. 23, 1998

(51) Int. Cl.⁷ .................................................. B26D 1/46
(52) U.S. Cl. ........................ 83/661; 83/171; 83/788; 83/814; 83/820; 451/451; 451/455
(58) Field of Search ........................ 83/171, 168, 169, 83/661, 788, 814, 820; 451/451, 455

(56) References Cited

U.S. PATENT DOCUMENTS

| | | |
|---|---|---|
| 1,987,551 | 1/1935 | Edwall . |
| 2,670,771 | 3/1954 | Lockwood et al. . |
| 2,685,311 | 8/1954 | Ferrari . |
| 2,862,231 | 12/1958 | Voigt . |
| 2,958,352 | 11/1960 | Kneisel . |
| 2,963,054 * | 12/1960 | Eschenburg ............................ 83/814 |
| 3,025,741 | 3/1962 | Wagner . |
| 3,045,520 | 7/1962 | Haruyama . |
| 3,092,155 | 6/1963 | Fowler et al. . |
| 3,104,576 * | 9/1963 | Robinson ............................... 83/814 |
| 3,263,537 * | 8/1966 | Rehman et al. ........................ 83/661 |
| 3,371,383 | 3/1968 | Hellsund . |
| 3,374,812 | 3/1968 | McManama . |
| 3,376,371 | 4/1968 | Opel et al. . |
| 3,396,615 | 8/1968 | Miller et al. . |
| 3,670,060 | 6/1972 | Cuffaro et al. ........................ 264/77 |
| 3,736,820 | 6/1973 | Jung . |
| 3,850,061 | 11/1974 | Wirstrom . |
| 3,954,037 * | 5/1976 | Rios ....................................... 83/661 |
| 3,972,254 | 8/1976 | Dillinger et al. . |
| 4,030,386 | 6/1977 | Poetzsch et al. . |
| 4,033,213 | 7/1977 | Eiselt et al. . |
| 4,082,021 | 4/1978 | Jung . |
| 4,085,246 | 4/1978 | Buser et al. ........................... 428/220 |
| 4,111,085 | 9/1978 | Johnson . |
| 4,211,131 | 7/1980 | Fenn et al. . |
| 4,274,389 * | 6/1981 | White et al. ............................. 83/168 |
| 4,433,070 | 2/1984 | Ross et al. . |
| 4,441,396 | 4/1984 | Mercier et al. . |

(List continued on next page.)

FOREIGN PATENT DOCUMENTS

| | | | |
|---|---|---|---|
| 1917419 | 4/1968 | (DE) . | |
| 2137550 * | 10/1984 | (GB) | ................................. 83/661 |
| 2193461 | 2/1988 | (GB) . | |
| 63-260792 | 10/1988 | (JP) | ................................. B26D/1/46 |
| 406179116 * | 6/1994 | (JP) | ................................. 83/788 |
| 8-3880 | 1/1996 | (JP) | ................................. D06N/3/14 |

OTHER PUBLICATIONS

SPI Plastics Engineering Handbook of the Society of the Plastics Industry, Inc., Fifth Edition, (1991), edited by Michael L. Berlins, published by Chapman & Hall, New York, NY, pp. 684–687.

Lebedev, V.S., SPLITTING SAWING MACHINES, Legkaya Industriya, Moscow, 1970, pp. 52, 53, 56, 57.

Primary Examiner—M. Rachuba
Assistant Examiner—Sean Pryor
(74) Attorney, Agent, or Firm—Aquilino, Welsh & Flaxman

(57) ABSTRACT

The invention relates to a method for producing sheets of polymeric surfacing, the sheets produced thereby, and the apparatus used to produce the sheets. The method includes providing a solid polymeric slab, and slicing the slab into sheets of surfacing. The sheets may include polymeric particles contained in a polymeric matrix. The particles may have a maximum linear dimension that is greater than the final thickness of the sheets, thereby resulting in an aesthetically pleasing "chunky" appearance. The apparatus used to slice the sheets produces a relatively smooth, uniform surface, and is capable of dramatically limiting the amount of variation in thickness within a finished sheet.

31 Claims, 10 Drawing Sheets

U.S. PATENT DOCUMENTS

| | | |
|---|---|---|
| 4,446,177 | 5/1984 | Munoz et al. . |
| 4,478,120 | 10/1984 | Sugimoto . |
| 4,484,417 * | 11/1984 | Klingerman ............................ 83/169 |
| 4,501,181 * | 2/1985 | Yakich .................................. 83/169 |
| 4,513,648 | 4/1985 | Mioche . |
| 4,515,548 | 5/1985 | Mioche . |
| 4,560,338 | 12/1985 | Mioche . |
| 4,566,427 | 1/1986 | Marechal et al. .................. 125/16 R |
| 4,567,739 | 2/1986 | Mascetti . |
| 4,606,254 | 8/1986 | Schmalz . |
| 4,660,454 | 4/1987 | Elsey . |
| 4,663,100 | 5/1987 | Mioche . |
| 4,885,967 | 12/1989 | Bell et al. . |
| 5,043,377 | 8/1991 | Nogi et al. ........................... 524/437 |
| 5,062,335 * | 11/1991 | Missler ................................. 83/168 |
| 5,213,022 | 5/1993 | Elgan . |
| 5,242,968 | 9/1993 | Minghetti et al. . |
| 5,243,892 | 9/1993 | Jindra . |
| 5,244,941 | 9/1993 | Bruckbauer et al. . |
| 5,678,466 * | 10/1997 | Wahl ..................................... 83/168 |
| 5,783,635 | 7/1998 | Akiyama et al. .................... 525/168 |

* cited by examiner

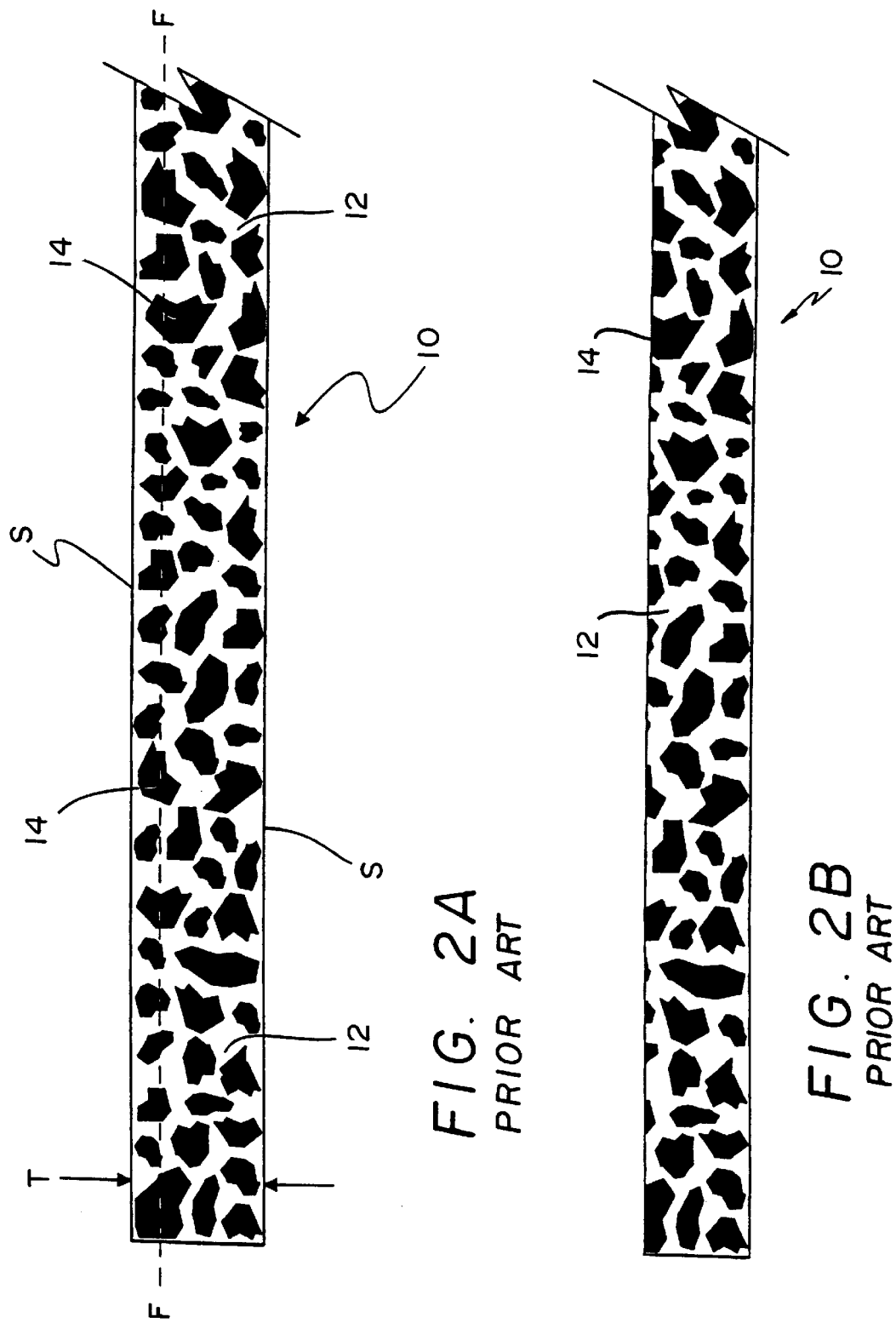

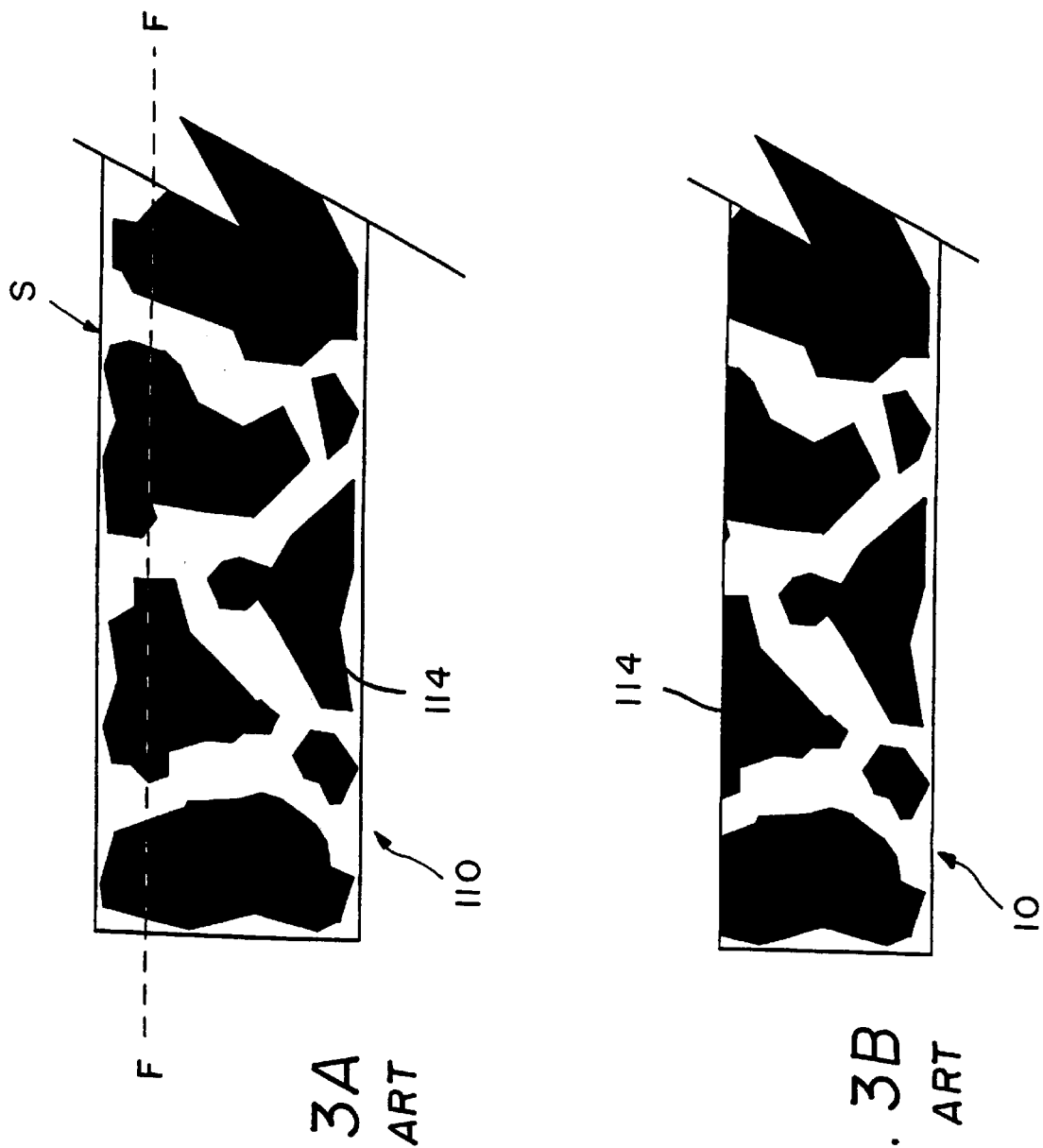

APPARATUS FOR PRODUCING SHEETS OF SOLID SURFACING

TECHNICAL FIELD

The present invention relates to apparatus used to cut polymer compositions produced in slabs or sheets and meant to simulate, for example, stone such as marble or granite. The present invention further relates to apparatus for slicing such slabs into sheets.

BACKGROUND OF THE INVENTION

Solid polymeric surfacing has a variety of uses, including household, commercial, and industrial uses in which durable, sometimes renewable, decorative surfaces are desired. Such surfaces include, but are not limited to, kitchen and other countertops, table tops, bathroom vanities, divider panels, and wall surfacing. These surfacing products may be produced so as to simulate stone such as marble or granite.

For example, U.S. Pat. Nos. 4,433,070, and 4,446,177 disclose compositions for such products. Additionally, U.S. Pat. Nos. 4,085,246 by Buser et al, 5,244,941 by Bruckbauer et al, and 5,242,968 by Minghetti et al, all of which are hereby incorporated by reference herein, disclose such compositions. U.S. Pat. No. 5,244,941 discloses a composition that is particularly useful as artificial stone surfacing, due to the inclusion of chips of a previously cured thermosetting resinous compound in the composition; also disclosed therein is the process for producing the surfacing. These products are typically produced in solid slabs about ½ inch in thickness. The result is surfacing of high quality, but relatively high cost.

It has been found previously that production and provision of these products in sheets about ⅛ inch in thickness results in a type of solid surfacing "veneer" having benefits similar to those of the ½ inch product, but at a significant reduction in cost. The ⅛ sheets are typically bonded to inexpensive particle board, or the like, resulting in a relatively strong but less expensive surfacing product.

The only method of producing ⅛ surfacing known to the prior art is with equipment that is prohibitively large and prohibitively expensive. Examples of such equipment are disclosed in U.S. Pat. Nos. 3,371,383 and 3,376,371. These references disclose a dual belt continuous casting system. This very expensive, very large, dual belt system is the only system that provides the degree of dimensional control necessary to produce a ⅛ thick sheet within required specifications and tolerances. The ½ inch product is produced on a similar single or dual belt system.

Problems with this prior art method of producing ⅛ sheets of surfacing also include the fact that the aesthetic results of the surfacing are limited when an artificial stone appearance is desired. As disclosed in U.S. Pat. No. 5,244,941, solid particulate is added to a resin matrix to give the surfacing a simulated stone appearance. Particulate is typically irregular in shape, but most approaches a quasi-spheroidal shape, and may be discussed as such for purposes herein. Naturally, the size of the particulate added to the resin matrix during the casting process is limited to the final thickness of the slabs; i.e, cast ⅛ inch thick surfacing cannot contain particulate that does not fit within the thickness of the sheet. This prohibits production of ⅛ inch thick product containing large sized particles that would result in a "chunky" look that occurs in some natural stone. This "chunky" look has been determined to be very aesthetically pleasing to consumers.

Lamellar, or disk-shaped, particles may be used, but with unacceptable results. Such particle shapes could have a maximum dimension that is greater than the sheet thickness and still fit within the sheet. However, the resin matrix typically is somewhat transparent, and the resultant effect from using lamellar shaped particles would not resemble the desirable "chunky" stone appearance. Instead the result would be oval and oblong particles that may partially disappear into the thickness of the sheet. Also, they may have a tendency to align during the sheet casting process, resulting in a less than random distribution of particles in the sheet.

Indeed, the only method of producing surfacing with a "chunky" look to date is by sanding or grinding relatively thick surfacing down in thickness to expose the interior (and thereby, a larger degree of flattened exposed surface area) of the particulate. This is necessary to produce a sheet with a surface look that is truly representative of the random nature of the particulate as dispersed in the resin matrix. As cast, the surface look of the slabs is not representative. Only the outer edges of the particulate approach the surface of the slab, and even then in only a tangential fashion. The random particulate pattern is not exposed until the sheet surface is sanded down. Indeed, some in the art feel that the sheet surfaces must be sanded down by ¼ to ½ the diameter of the largest particulate size in the sheet to get the best aesthetic results. As one can plainly see, sheets are produced by this method at the expense of grinding off a huge amount of the material. Obviously, this method is very costly, in terms of the necessary manufacturing equipment, increased manufacturing time, and wasted surfacing material.

To produce relatively thin sheets of veneer, Applicants have attempted to slice ½ inch slabs of solid polymeric surfacing through their thickness using the type of saw that is typically used for cutting marble and granite. These attempts have been unsuccessful, in that the stone saws remove too much material during cutting and also produce a very rough, irregular surface that is unacceptable in solid surfacing veneer. These and other available saws that have been tried result in unacceptable levels of thickness variation within a sheet, unacceptable sheet curvature, unacceptable surface roughness and irregularity, an unacceptable decrease in sheet durability, and a high frequency of saw blade breakage. In fact, every industrial quality saw expert approached about developing a saw for such an application stated that it would be "impossible".

As a result, there exists a need to produce solid surfacing veneer, and in fact various thicknesses of solid surfacing, in a way that does not require the very large and expensive prior art equipment. There also exists a need for a method to produce simulated stone solid surfacing with an aesthetically pleasing "chunky" look, which cannot be accomplished by the prior art method. There also exists a need for apparatus that may be used to slice through the thickness of slabs of solid polymeric surfacing that overcomes the problems with prior art equipment.

SUMMARY OF THE INVENTION

Disclosed is a method for producing sheets of polymeric surfacing and the sheets therefrom. The method includes providing a solid polymeric slab, and cutting the slab into sheets of surfacing. The final thickness of the sheets may vary to a minimum of about ⅛ inch.

The disclosed method may include the steps of providing a resin matrix syrup, providing relatively solid polymeric particles, coating the particles with an adhesion promoter, combining the particles and the syrup into a mixture, forming the mixture into a solidified slab, and cutting the slab into sheets of surfacing. The particles may have a maximum linear dimension that is greater than the final thickness of the sheets.

Also disclosed is apparatus for slicing a workpiece, most preferably a slab of polymeric material, into sheets. The apparatus includes a continuous blade band saw having a slicing blade with a cutting edge, and at least two blade guides to stabilize the position of the blade relative to the workpiece. The blade is under a tension of from about 7500 pounds per square inch (psi) to about 35000 psi. The blade has a width of from about 2 inches to about 4 inches, the cutting edge has from about 2 to about 4 teeth per inch, and the blade has a kerf of from about 0.050 inches to about 0.075 inches. During the slicing operation, the blade preferably travels at a linear speed of from about 5000 feet per minute to about 10000 feet per minute.

Also included are a workpiece support member for supporting the workpiece during slicing, a fluid supply for cooling the blade and workpiece during slicing, and a workpiece stabilizing member located between the support member and the blade. The workpiece-stabilizing member may be at least one set of pinch rollers, which preferably apply a pressure on the workpiece of from about 50 psi to about 100 psi, and more preferably from about 70 psi to about 90 psi. When the workpiece and blade cutting edge are moved toward each other, the stabilizing member holds the workpiece firmly in place with respect to the blade at a location just prior to the workpiece entering the blade.

The workpiece has a longitudinal axis oriented perpendicular to a direction of blade travel during slicing. Workpiece guides maintain the longitudinal axis of the workpiece in a substantially perpendicular orientation to the direction of blade travel during slicing. The blade rides on a drive wheel and at least one idler wheel, which support and drive the blade. Each of these wheels preferably has a diameter of from about 24 inches to about 48 inches. Most preferably, a finished sheet after slicing has a maximum standard deviation in thickness of about 0.002 inches.

BRIEF DESCRIPTION OF THE DRAWINGS

FIG. 2A shows solid surface veneer of the prior art; line F—F shows the depth to which the surface must be sanded down to expose the particulate for an artificial stone appearance.

FIG. 2B shows the veneer of FIG. 2A after the surface is sanded down.

FIG. 3A shows a relatively thick piece of prior art solid surfacing; line F—F shows the depth to which the surface must be sanded down to expose a substantial amount of the interior of the particulate, thereby producing a "chunky" artificial stone appearance.

FIG. 3B shows the surfacing of FIG. 3A after the surface is sanded down.

DETAILED DESCRIPTION OF THE PREFERRED EMBODIMENT

A. Method of Production and Article

Figure 1:
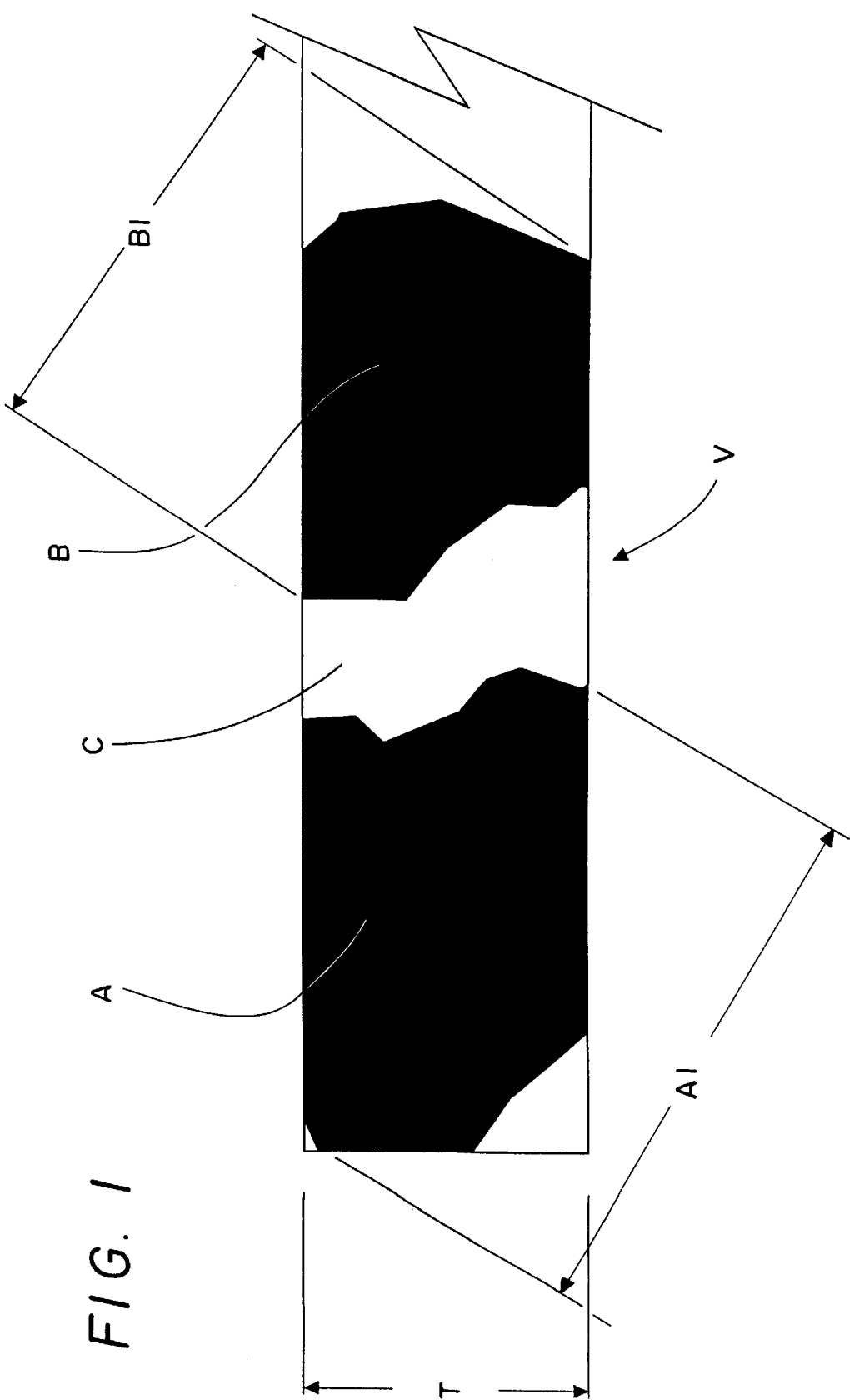
FIG. 1 shows a portion of a sheet of solid surface veneer having particles with maximum linear dimensions greater than the sheet thickness.

Disclosed is a method for producing sheets of polymeric surfacing, otherwise referred to as artificial stone surfacing, solid surfacing, or solid surfacing veneer, and the sheets resulting from this method. The present method particularly allows the manufacture of solid surfacing veneer with a "chunky" appearance provided by the particulate in the surfacing. In other words, the "chunks" of particulate in the surface of the sheets have a maximum size or linear dimension that is greater than the thickness of the sheet. Referring to FIG. 1, a portion of a sheet of veneer "V" is shown having particles A and B encased in resin matrix C. Maximum linear dimensions of particles A and B are A1 and B1 respectively, both dimensions being greater than sheet thickness "T". Thickness "T" is typically on the order of about ⅛ inches. In the prior art, this "chunky" look has only been achieved in sheets greater than ¼ inch in thickness, and only through sanding or grinding a relatively substantial amount of material from the sheet surface, resulting in increased production time and cost, and increased wasted material.

FIG. 2A shows a slab of solid surfacing veneer 10 in the "as cast" form. Prior art slabs of this type are usually made using a two-belt casting system as described, for example, in U.S. Pat. Nos. 3,371,383 and 3,376,371. Shown are resin matrix 12 and particulate 14. Note that the maximum diameter of each piece of particulate 14 may not be greater than sheet thickness "T", or bulges would result in sheet 10 where particulate 14 extended out past surface "S" of slab 10; such bulges would interfere with the casting process and result in unacceptable product. Line F—F denotes the depth to which surface "S" is sanded to help expose a portion of the particulate thereby bringing out the artificial stone appearance. Note in FIG. 2B that only a small amount of the particulate 14 interior may be exposed by this prior art method. The result is an artificial stone appearance, but with a relatively small granular pattern.

FIG. 3A shows a piece of the relatively thick prior art solid surfacing 110 which may contain larger sized particles 114 because of the greater sheet thickness. To expose a large amount of particle 114 interior, the surface S of the slab must be ground down to the level at line F—F. The result is still a relatively thick and expensive product. The result is also a chunky appearance, as demonstrated by FIG. 3B, but at the expense of increased manufacturing time and cost, and substantial wasted material.

Figure 4A:
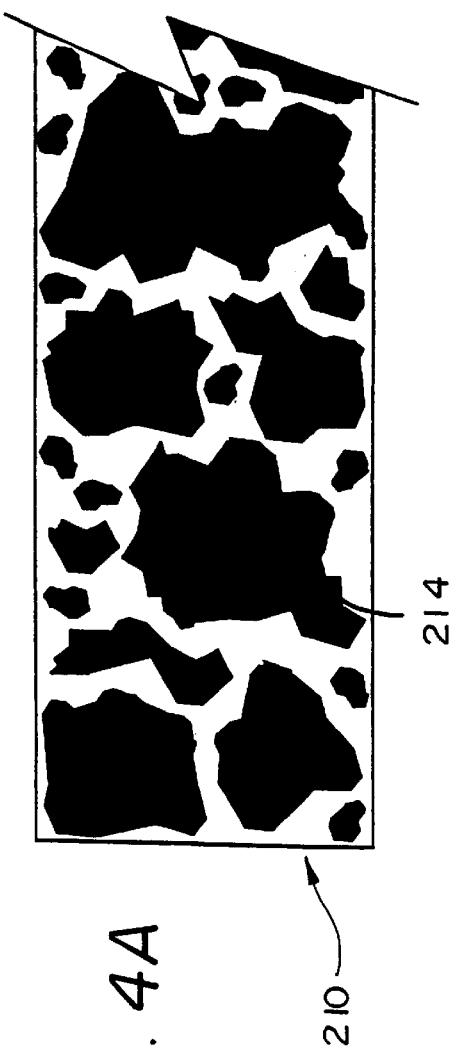
FIG. 4A shows a slab of solid surfacing of the present invention, containing large sized particulate.
Figure 4B:
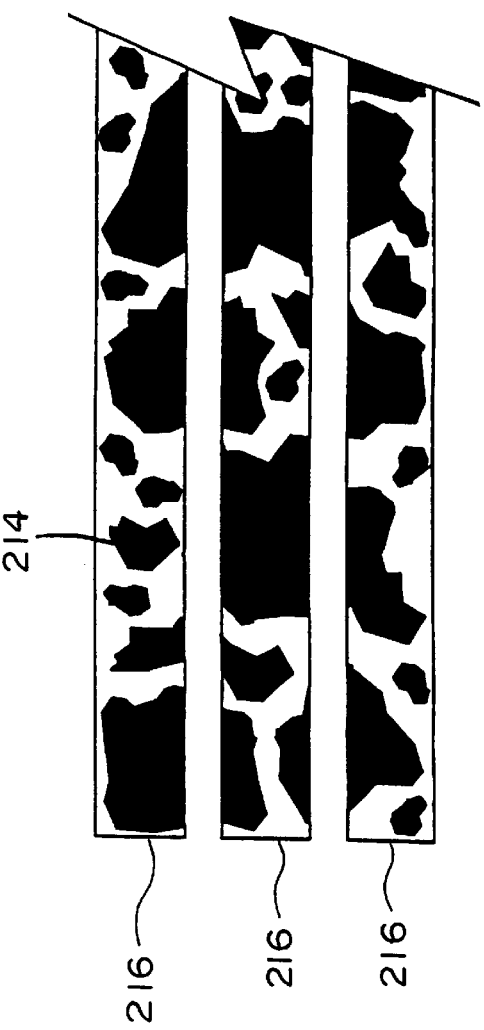
FIG. 4B shows the slab of FIG. 4A after slicing the slab into three relatively thin pieces of solid surface veneer, thereby exposing a substantial amount of the interior of the particulate, and resulting in a "chunky" artificial stone appearance, without the need for grinding excessive amounts of material from the slab.
Figure 5A:
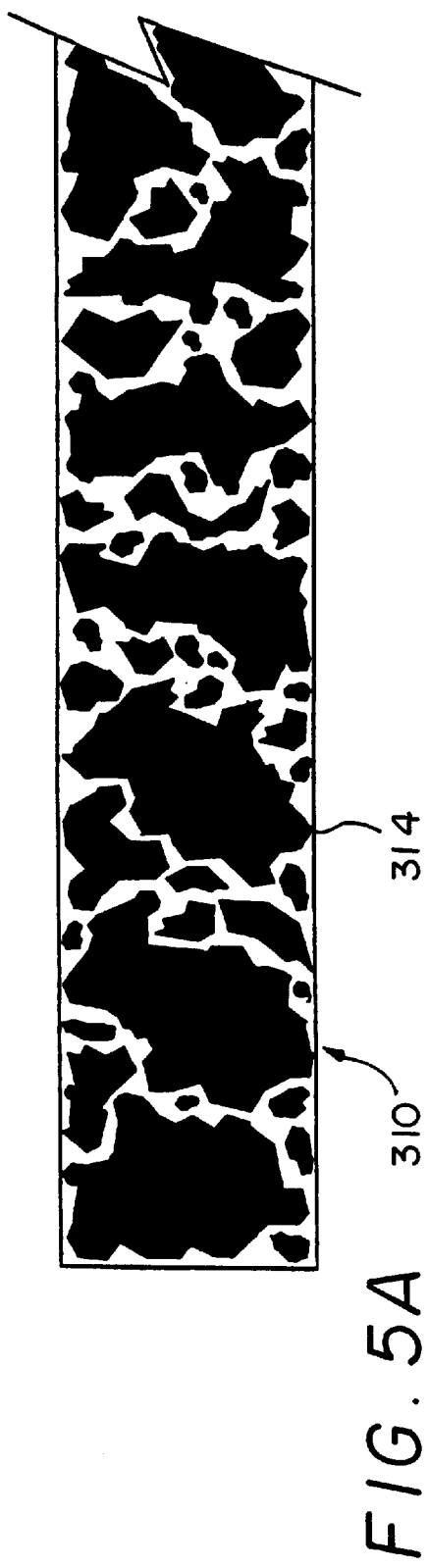
FIGS. 5A and 5B show an alternative to FIGS. 4A and 4B, wherein a majority of the particulate is very large in size, thereby resulting in a "super-chunky" appearance.
Figure 5B:
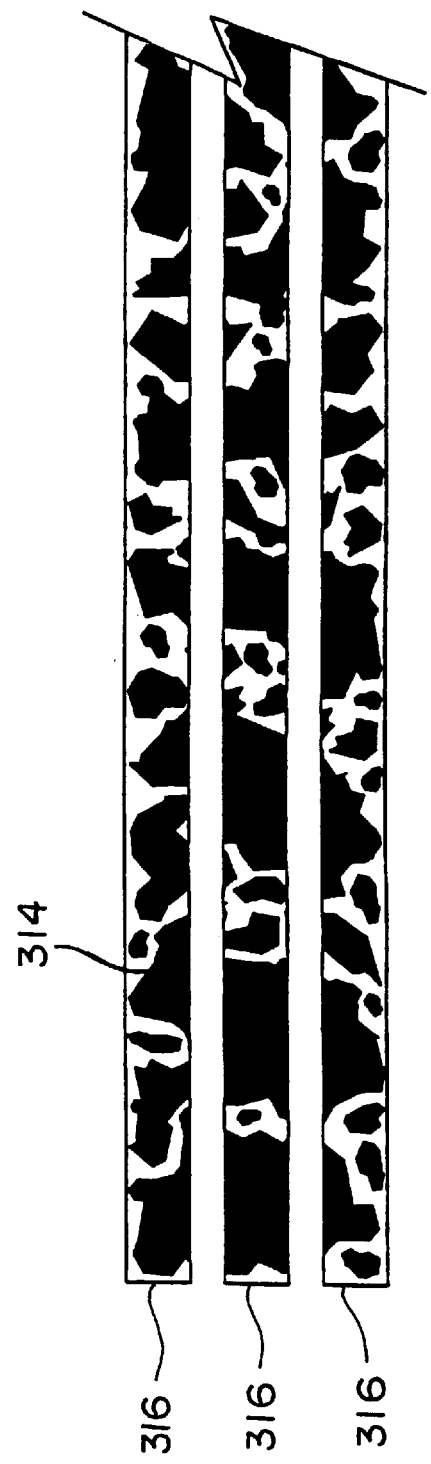

FIG. 4A shows a slab of artificial stone 210 of the present invention. Particulate 214 may be of a diameter as great as the slab thickness. By slicing the slab through its thickness, multiple sheets of solid surface veneer 216 are produced, as shown in FIG. 4B. Note that because the particulate 214 is sliced through its interior, the result is a "chunky" appearance without the need for the excessive surface grinding necessary in the prior art method to produce a similar appearance. A slab of about ½ inch in thickness may be sliced into 3 sheets of veneer each about ⅛ inch in thickness, accounting for material lost in the slicing operation. The material lost in the slicing operation is still a great reduction in waste over the prior art method of producing the "chunky" appearance. The present veneer is produced without the need for the excessively large and expensive dual-belt casting equipment, without significant material waste, and without excessive surfacing grinding time, equipment and cost. FIGS. 5A and 5B show an alternative of the present invention in which the size of a majority of the particulate 314 used in the slab 310 approaches the thickness of the slab. The result is a sheet of veneer 316 with a "super-chunky" appearance.

In fact, it is anticipated that the present method may be used to overcome the problems described above in cutting sheets of various thicknesses from about ⅛ inches up to about ½ inches, or more if the specific application for thicker sheets warrants such. For example, a 2 inch thick slab of solid polymeric surfacing may be sliced into three sheets of about, or a little less than, ½ inches in thickness, and three sheets of about, or a little less than, ⅛ inches in thickness, accounting for material lost during slicing. In any event and for any final sheet thickness, the present method achieves a chunky surface appearance without excessive surface grinding and wasted material.

The particles that are added to the resin matrix to achieve the "chunky" artificial stone appearance may be composed of many different material types. For example, particles may be made of thermoplastic resins such as acrylic resins, acrylic blends with polycarbonate or polystyrene, polyesters, polyamides, and polyolefins. Particles may also be made of thermoset resins such as unsaturated polyesters and blends with acrylics or polyvinylacetates or polystyrenes, melamine formaldehyde, phenol formaldehyde, epoxies, and vinyl esters. Particles may additionally be of organometallic resins such as the thermoplastics and thermosets listed above along with sol gel resins based on tetraethoxyortho silicate or triethoxy aluminate or tetralkoxy titanates. Finally, particles may be composed of minerals like granite, marble, or quartz, or may be man made glass, ceramics, sol gels, or cement.

The resin matrix may also be composed of many different material types. For example, the resin matrix may be made of thermoplastic resins such as acrylic resins, acrylic blends with polycarbonate or polystyrene, polyesters, polyamides, and polyolefins. The matrix may also be made of thermoset resins such as unsaturated polyesters and blends with acrylics or polyvinylacetates or polystyrenes, melamine formaldehyde, phenol formaldehyde, epoxies, and vinyl esters. The matrix may additionally be of organometallic resins such as the thermoplastics and thermosets listed above along with sol gel resins based on tetraethoxyortho silicate or triethoxy aluminate or tetralkoxy titanates. Finally, the matrix may be composed of inorganics (e.g, cements).

One specific example of a particle material is a particulate manufactured and sold by Amoco Corp. under the trade name "AMODEL 1460". AMODEL 1460 is an engineering thermoplastic and is supplied in pellet form. The composition of the pellet is about 40% polyphthalamide resin and 60% wollastonite, a mineral filler known in the art. Pigments may be added to vary the color of the pellets. The weight percentage of wollastonite may be reduced to compensate for the addition of pigments. The pellets may be pulverized and sized according to the desired aesthetic effect in the final sheets of surfacing.

The particles may be treated or coated with an adhesion promoter or coupling agent prior to being mixed with the resin matrix. The purpose of such coating is to promote adhesion between the surface of the particles and the resin matrix; in other words, the purpose is to form a bond between the particles and the matrix. This bond prevents gaps, inclusions, and the like from occurring between the particles and the resin matrix, which could initiate cracks, etc. Such treating is particularly important in the case of the present invention because inclusions in a slab of solid surfacing may result in stress cracking, crazing, and like defects after cutting through the slab, which will be disclosed in more detail below.

Examples of adhesion promoters are the organofunctional silane products manufactured and sold by OSI of Tarrytown, N.Y. (e.g., AMINO A1100, METHACRYL A-172, and EPOXY A-187). These are dual-function molecules that contain an organofunctional group and a hydrolyzable group; they can react with a wide variety of organic and inorganic materials. They may be used as a filler treatment for improved filler-to-resin coupling and filler dispersion in thermoset and thermoplastic resins. For example, the organofunctional silane sold by OSI under the trade name "AMINO A- 1100", whose chemical name is gamma-aminopropyltriethoxysilane, is one adhesion promoter that is generally effective when coupling particles into an acrylic resin matrix. Additionally, Dow Corning produces silanes, e.g, Z-6020 diamino and Z-6040 epoxy. Typically, the particles are coated with the adhesion promoter in a twin-shell blender of the type sold by Patterson-Kelly Co. of East Stroudsburg, Pa.

B. Apparatus for Production

Figure 6:
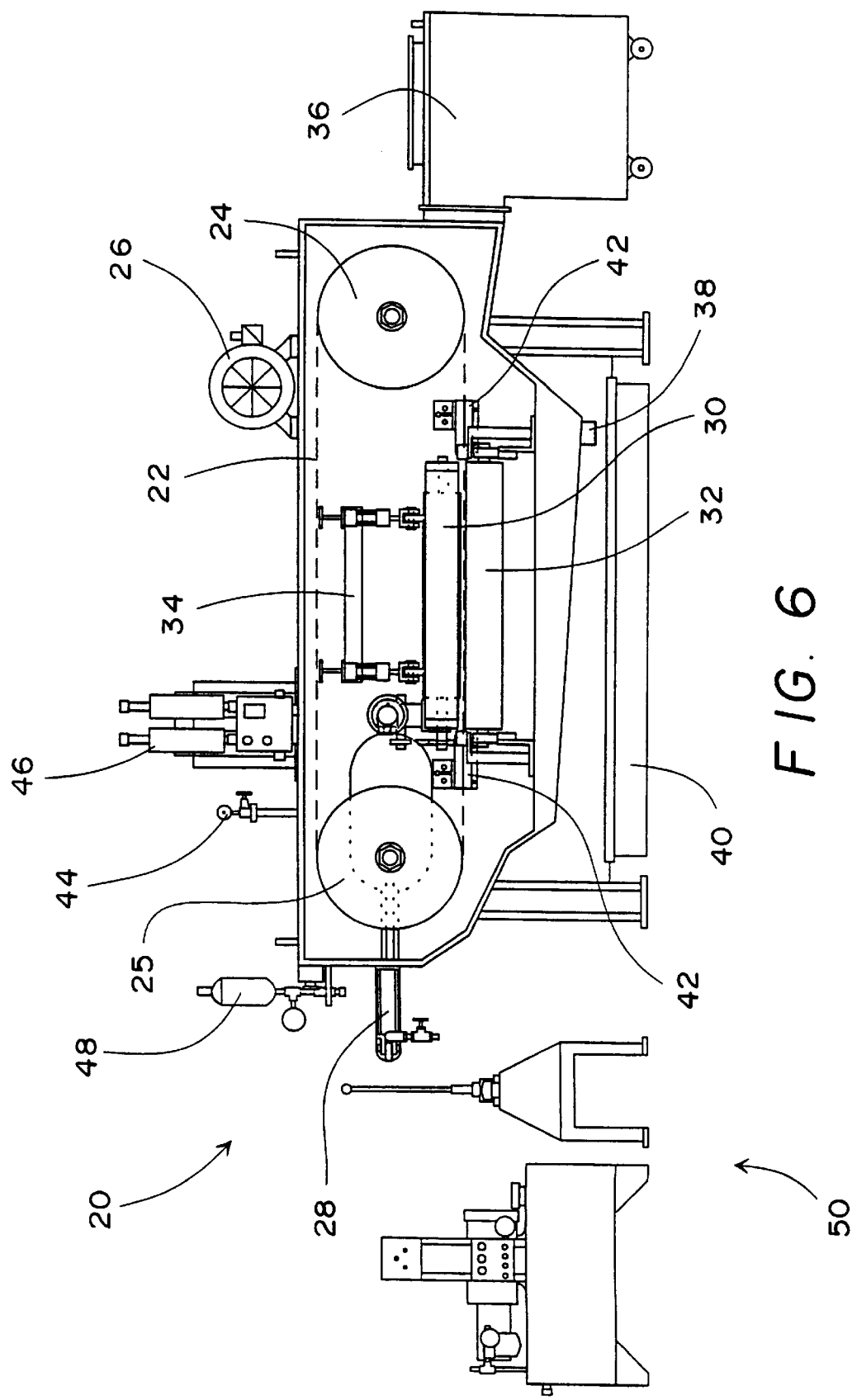
FIG. 6 shows an elevational view of an embodiment of a saw of the present invention, used to slice slabs of solid surfacing into relatively thin sheets.

An embodiment of the solid surfacing slicing saw of the present invention is shown in FIGS. 6–10. FIG. 6 shows an elevational view of the front of saw 20, or the area of saw 20 that the polymeric slabs or workpieces would be fed into. The slabs would be fed into saw 20 lying flat, or horizontally, on a conveyor belt, but it is also-anticipated that slabs could be fed into saw 20 in a vertical orientation if saw 20 were configured to accommodate such vertical orientation.

Blade 22 rides on and is driven by drive wheel 24 and idler wheel 25. Blade 22 is preferably from about 2 inches to about 4 inches in width, and has a cutting edge with preferably from about 2 to about 4 teeth per inch. The blade is typically made of steel and the teeth are preferably carbide tipped. The preferred range of blade kerf (i.e., the thickness of the cut made by blade 22) is from about 0.050 inches to about 0.075 inches, with the most preferred kerf being about 0.052 inches. During slicing, blade 22 travels at a preferred linear speed of from about 5000 feet per minute to about 10000 feet per minute, while under a tension of from about 7500 pounds per square inch (psi) to about 35000 psi. More preferred ranges of speed and tension are from about 8000 feet per minute to about 9000 feet per minute, and from about 10000 psi to about 25000 psi respectively.

Drive wheel 24 and idler wheel 25 carry blade 22. Drive wheel 24 is driven by drive motor 26, typically through a drive belt (see drive belt enclosure 27 in FIG. 9). Drive motor 26 is typically a 25 horsepower, 240/480 volt, 3 phase, AC/DC variable drive motor, to accommodate the pressure exerted on blade 22 during slicing. Wheels 24 and 25 are preferably from about 24 inches to about 48 inches in diameter, with the most preferred diameter being about 36 inches. Wheels 24 and 25 each ride on a 3¹⁵⁄₁₆ inch shaft using spherical roller bearings (e.g, Browning SFC1000E by Browning Manufacturing, Emerson Power Transmission Corp., Maysville, Ky.). The horizontal position of idler wheel 25 is adjustable through blade tensioner 28, which provides for increasing or decreasing the tension on blade 22. Blade tensioner 28 is hydraulically controlled, but may also be mechanical, pneumatic, or the like.

Upper primary pinch roller 30 and lower primary pinch roller 32 apply pressure to the polymeric slab and operate to drive the slab through blade 22. A second set of pinch rollers 31 and 33 (see FIGS. 9–10) is included between pinch rollers 30 and 32 and blade 22. The two sets of pinch rollers operate to stabilize the slab and to keep the plane of the slab substantially parallel to the plane of blade 22 during slicing. Upper pinch rollers 30 and 31 are typically about 6 inches in diameter, made of steel, and covered with ruff grip top belting material to firmly grasp the workpiece. Lower rollers 32 and 33 are typically about 6 inches in diameter, made of steel, precision ground (because their dimensions determine the thickness variation in the final sheets—see below), and nitride coated for wear resistance and rust prevention. Rollers 30, 31, 32, and 33 are hydraulically driven, but may be driven by mechanical, or other means known in the art.

Pinch roller pressure applicator 34 operates to put upper pinch rollers 30 and 31 into pressurized contact with the slab to force the slab against lower pinch rollers 32 and 33, thereby keeping the slab stable as it passes through blade 22. The preferred range of pressure applied to the slab by pinch rollers 30, 31, 32, and 33 is from about 50 psi to about 100 psi, with a more preferred range being from about 70 psi to about 90 psi.

The thickness of the slices produced by saw 20 are determined by the vertical distance between blade 22 and lower pinch rollers 32 and 33 in the cutting area of saw 20. In the current embodiment, the vertical position of blade 22 is fixed and the vertical position of lower pinch rollers 32 and 33 is adjustable; for best control over variation in thickness, finished sheets would therefore come off the bottom of the slab. The maximum standard deviation in thickness of finished sheets has been found to be about 0.002 inches. This level of precision cutting has never before been achieved with prior art band saws, and particularly in view of use with solid polymeric materials being sliced into relatively thin sheets over typical distances of about 36 inches to about 48 inches. The vertical position of lower rollers 32 and 33 is currently controlled by a mechanical adjustment, but such adjustment could be electronic, hydraulic, pneumatic, or the like.

Pneumatic switch 44 and pneumatic controls 46 operate pinch roller pressure applicator 34, thereby raising and lowering pressure applicator 34 and controlling the amount of pressure that applicator 34 exerts on a slab during the slicing operation. Accumulator 48 operates to keep the tension on blade 22 constant during operation, by acting like a shock-absorber; if the blade is stressed during operation, accumulator 48 acts to automatically counter the stress and prevent breakage of blade 22. Hydraulic controls 50 operate blade tensioner 28, and the drive mechanism that turns pinch rollers 30 and 32.

Figure 7:
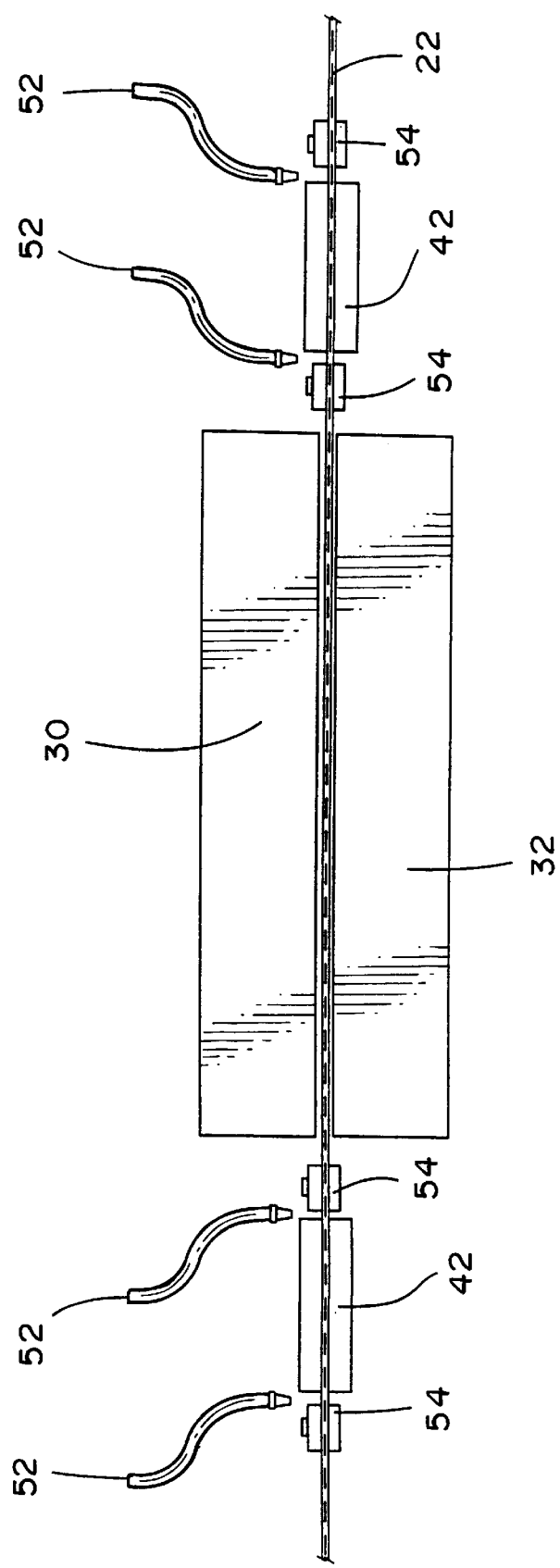
FIG. 7 shows an exploded view of the pinch roller and blade area of FIG. 6.
Figure 8:
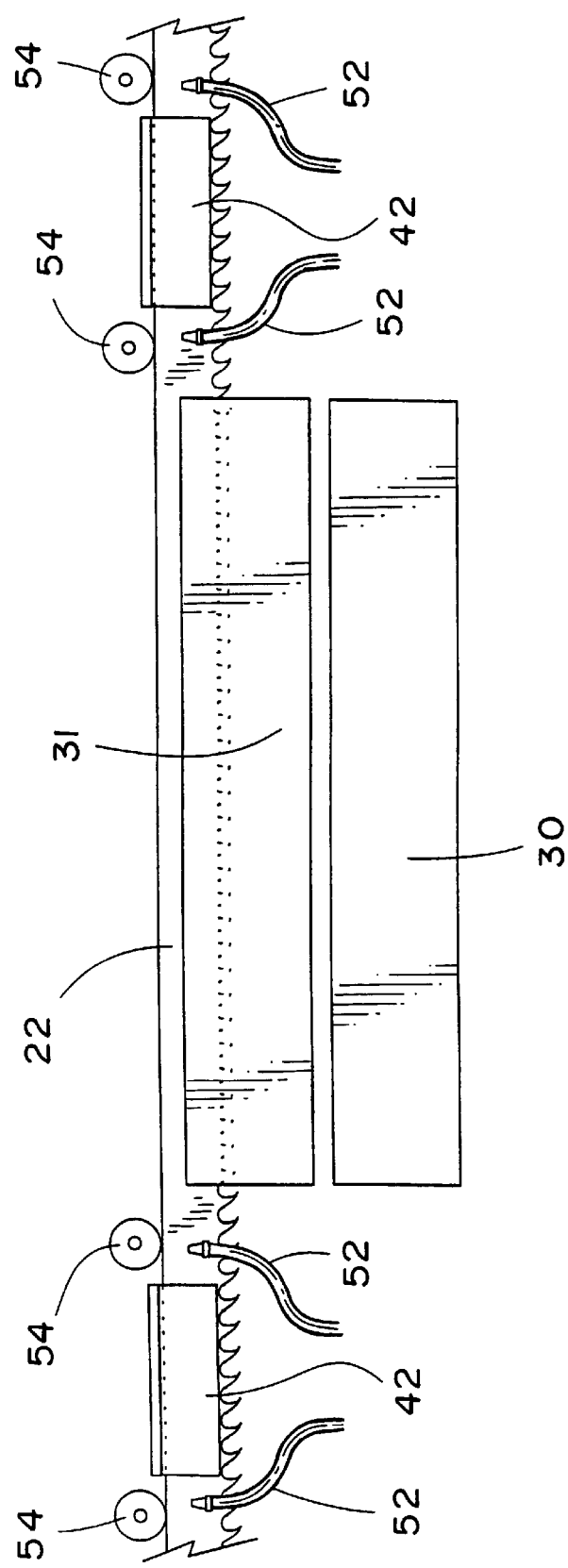
FIG. 8 is a top view of the pinch roller and blade area of FIG. 7.

Dust collector 36 collects cutting debris, i.e. polymer chips, generated during the slicing operation. A coolant is used to cool, lubricate, and wash cutting debris from the slab and blade 22. Referring now to FIGS. 7 and 8, coolant nozzles 52 bathe the slicing area of saw 20 with coolant before and after each blade guide 42. The coolant may be water or a low viscosity lubricant. The coolant then drains out coolant drain 38 into coolant pan 40, or more preferably through a recycling mechanism that filters the coolant and pumps it back onto the slab and blade 22. Blade guides 42 maintain the vertical position and stability of blade 22 during operation of saw 20. Blade guides 42 provide fixed position horizontal slits through which blade 22 travels during its cycle. Blade guides 42 may be made of ultra-high molecular weight polyethylene, brass which does not wear as fast as the polyethylene, or any similar relatively soft material. Blade rollers 54, positioned as shown in FIGS. 7 and 8, maintain the horizontal position and stability of blade 22 during operation of saw 20; they are typically made of steel and provide back support to blade 22 as the workpiece is being pushed into and through blade 22, thereby preventing horizontal deflection of blade 22.

Figure 9:
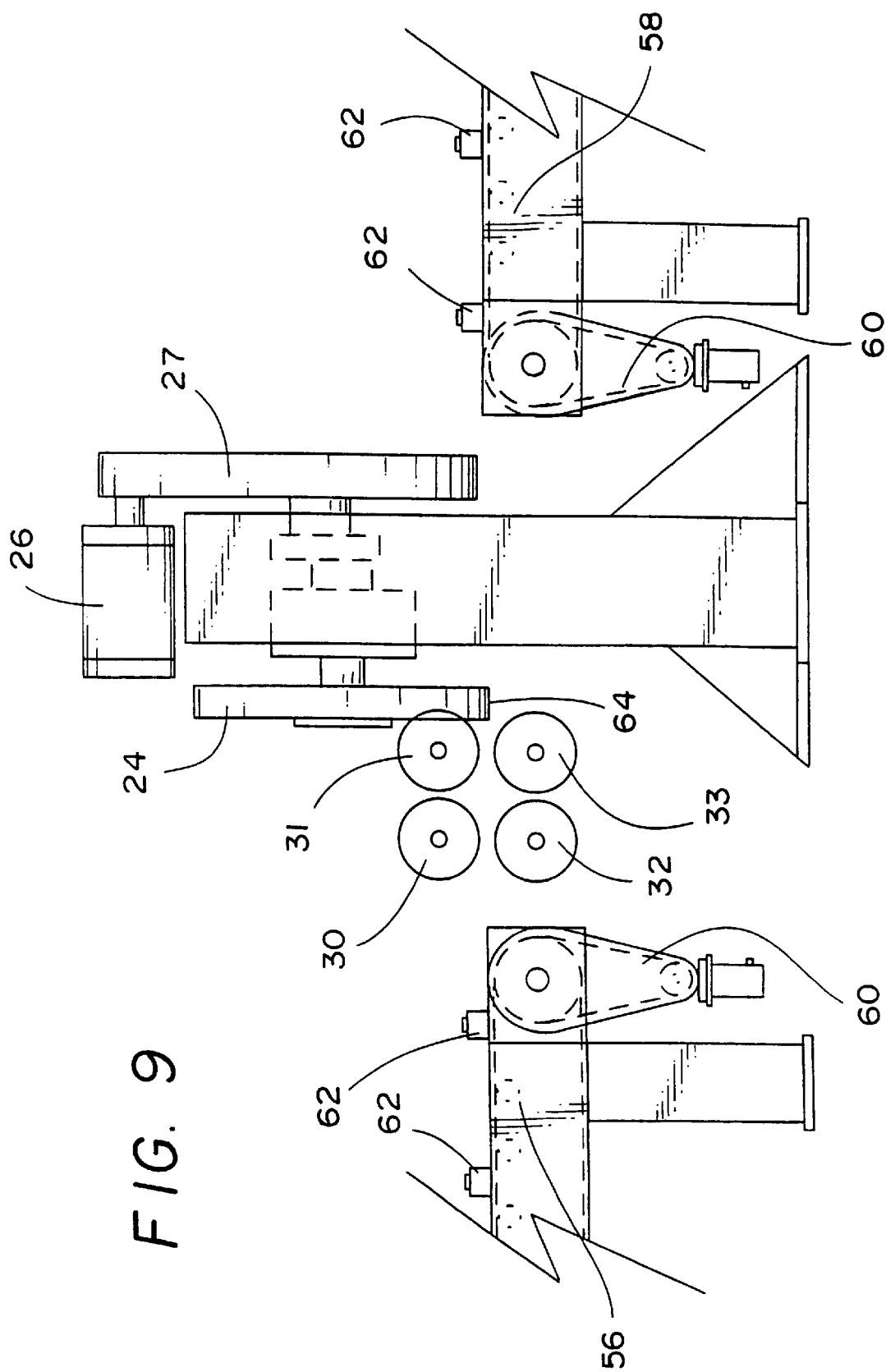
FIG. 9 shows a side elevational view of the saw of FIG. 6, with certain structural elements removed for clarity.
Figure 10:
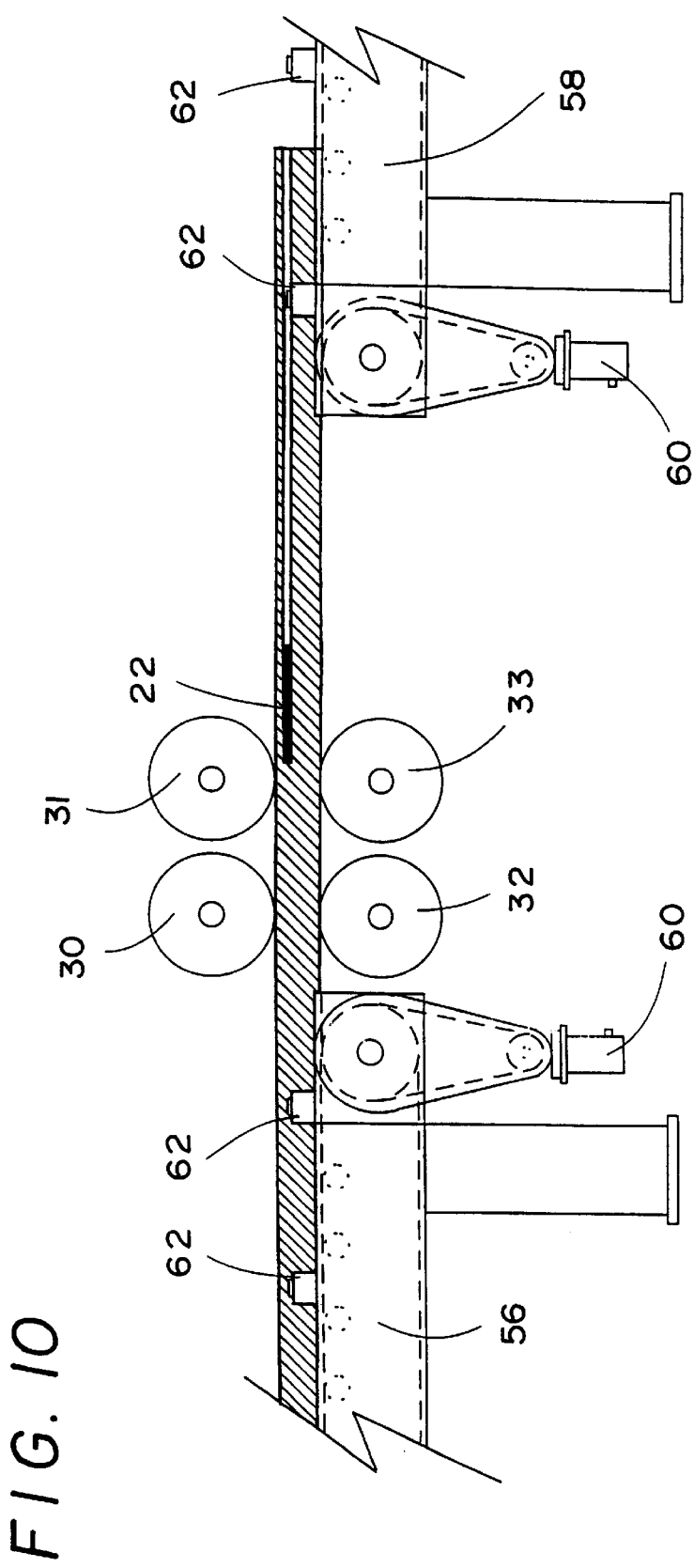
FIG. 10 shows an exploded view of the pinch roller and blade area of FIG. 9, as it appears while slicing through a slab of polymeric material during the slicing operation.

FIGS. 9 and 10 show feed conveyor 56, which supports and feeds a workpiece into saw 20, and back conveyor 58 which supports and takes up a finished workpiece after slicing (NJR Industries, Mobile, Ala.). These conveyors are made with ruff grip top belt material to prevent slippage during operation. Conveyor drives 60 operate movement and speed of conveyors 56 and 58, and must be synchronized with the speed of pinch rollers 30, 31, 32, and 33 so that a workpiece may be fed through saw 20 at a steady, uniform rate. The edge of a slab or workpiece is lined up against workpiece guide rollers 62 on top of feed conveyor 56 to insure that the longitudinal axis of the workpiece remains substantially perpendicular to the direction of travel of blade 22 during the slicing operation. FIG. 10 shows the position of a slab of polymeric material during the slicing operation.

Referring now to FIG. 9, the height of the top surfaces of conveyors 56 and 58 are adjusted so as to align with the tops of lower rollers 32 and 33. This vertical position is set at some point below cutting level 64 on blade 22; level 64 corresponds to the lower vertical level of the cutting portion of blade 22. For example, a typical distance between level 64 and the top level of alignment of rollers 32 and 33 and the top surfaces of conveyors 56 and 58 is about ⅛ inches. The speed of conveyors 56 and 58 and rollers 30, 31, 32, and 33 is then synchronized to provide for uniform stable feed of the slab or workpiece through saw 20.

The slab is then laid flat on the top surface of conveyor 56, and the edge of the slab is positioned up against workpiece guide rollers 62. Rollers 62 are positioned along one edge of conveyor 56 so that the longitudinal axis of the slab may be positioned substantially perpendicular to the direction of travel of blade 22 as the slab is fed into saw 20. The slab is then fed forward into pinch rollers 30, 31, 32, and 33, which through pressurized contact hold the slab very stable and substantially parallel to blade 22 as the slab is fed into and passed through blade 22.

Referring now to FIGS. 7 and 8, coolant from nozzles 52 is sprayed onto the cutting area to cool, clean, and lubricate blade 22 and the workpiece. Blade guides 42 stabilize the vertical position and blade rollers 54 stabilize the horizontal position of blade 22 as it passes through the workpiece. The sliced slab then passes through the back of saw 20 onto back conveyor 58 which transfers the sliced slab away from saw 20. The main body of the previously sliced slab may then be run through saw 20 over again to produce another finished sheet, until the slab has been exhausted.

Additional advantages and modifications will be readily apparent to one skilled in the art, while falling within the spirit and scope of the claimed invention. The claimed invention in its broader aspects is not, therefore, limited to the specific examples and structures described above and claimed below. Any such advantages and modifications, while not specifically described and claimed herein, are deemed to be within the spirit and scope of the presently disclosed and claimed general inventive concept.

What is claimed is:

1. Apparatus for slicing a workpiece of solid polymeric surfacing material into sheets, each sheet having a thickness with a standard deviation in thickness of about 0.002 inches, the apparatus comprising:
   (a) a continuous blade band saw having a slicing blade with a cutting edge wherein the blade travels at a linear speed of from about 5000 feet per minute to about 10000 feet per minute during slicing;
   (b) at least one workpiece support member for supporting the workpiece during slicing;
   (c) a fluid supply for cooling the blade and workpiece during slicing; and
   (d) a workpiece stabilizing member located between the support member and the blade;
   whereby, when the workpiece and blade cutting edge are moved toward each other the stabilizing member holds the workpiece firmly in place with respect to the blade at a location just prior to the workpiece entering the blade.

2. The apparatus according to claim 1, wherein the workpiece has a longitudinal axis oriented perpendicular to a direction of blade travel during slicing, and further comprising workpiece guides for maintaining the longitudinal axis of the workpiece in a substantially perpendicular orientation to the direction of blade travel during slicing.

3. The apparatus according to claim 1, wherein the workpiece-stabilizing member comprises at least one set of pinch rollers.

4. The apparatus according to claim 1, further comprising a drive wheel and an idler wheel for supporting and driving the blade, each wheel having a diameter of from about 24 inches to about 48 inches.

5. The apparatus according to claim 1, wherein the blade is under a tension of from about 7500 psi to about 35000 psi.

6. The apparatus according to claim 3, wherein the pinch rollers apply a pressure of from about 50 psi to about 100 psi to the workpiece.

7. The apparatus according to claim 1, wherein the blade has a width of from about 2 inches to about 4 inches.

8. The apparatus according to claim 1, wherein the cutting edge comprises from about 2 to about 4 teeth per inch.

9. The apparatus according to claim 8, wherein the blade has a kerf of from about 0.050 inches to about 0.075 inches.

10. Apparatus for slicing a workpiece into sheets, each sheet having a thickness, the apparatus comprising:
    (a) a continuous blade band saw having a slicing blade with a cutting edge, and at least two blade guides to stabilize the position of the blade relative to the workpiece, the blade being under a tension of about 7500 psi to about 35000 psi, the blade having a width of from about 2 inches to about 4 inches, the cutting edge comprising from about 2 to about 4 teeth per inch, and the blade having a kerf of from about 0.050 inches to about 0.075 inches, wherein during slicing the blade travels at a linear speed of from about 5000 feet per minute to about 10000 feet per minute;
    (b) at least one workpiece support member for supporting the workpiece during slicing; and
    (c) a workpiece stabilizing member located between the support member and the blade;
    whereby, when the workpiece and blade cutting edge are moved toward each other the stabilizing member holds the workpiece firmly in place with respect to the blade at a location just prior to the workpiece entering the blade.

11. The apparatus according to claim 10, wherein the workpiece has a longitudinal axis oriented perpendicular to a direction of blade travel during slicing, and further comprising workpiece guides for maintaining the longitudinal axis of the workpiece in a substantially perpendicular orientation to the direction of blade travel during slicing.

12. The apparatus according to claim 10, wherein the workpiece-stabilizing member comprises at least one set of pinch rollers, the pinch rollers applying a pressure on the workpiece of from about 50 psi to about 100 psi.

13. The apparatus according to claim 10, further comprising a drive wheel and an idler wheel for supporting and driving the blade, each wheel having a diameter of from about 24 inches to about 48 inches.

14. The apparatus according to claim 10, wherein the workpiece is a slab of polymeric material, and wherein a finished sheet has a maximum standard deviation in thickness of about 0.002 inches.

15. Apparatus for slicing a polymeric slab workpiece into sheets, the sheets having a thickness, the apparatus comprising:
    (a) a continuous blade band saw having a slicing blade with a cutting edge, and at least two blade guides to stabilize the position of the blade relative to the slab, the blade being under a tension of about 7500 psi to about 35000 psi, the blade having a width of from about 2 inches to about 4 inches, the cutting edge comprising from about 2 to about 4 teeth per inch, and the blade having a kerf of from about 0.050 inches to about 0.075 inches, wherein during slicing the blade travels at a linear speed of from about 5000 feet per minute to about 10000 feet per minute;
    (b) at least one slab support member for supporting the slab during slicing; and
    (c) at least one set of pinch rollers located between the support member and the blade for stabilizing the position of the slab relative to the blade, the pinch rollers applying a pressure on the slab of from about 50 psi to about 100 psi;
    whereby, when the slab is moved toward the blade cutting edge the pinch rollers hold the slab firmly in position with respect to the blade at a location just prior to the slab entering the blade.

16. The apparatus according to claim 15, wherein the workpiece has a longitudinal axis oriented perpendicular to a direction of blade travel during slicing, and further comprising workpiece guides for maintaining the longitudinal axis of the workpiece in a substantially perpendicular orientation to the direction of blade travel during slicing.

17. The apparatus according to claim 15, further comprising a drive wheel and an idler wheel for supporting and driving the blade, each wheel having a diameter of from about 24 inches to about 48 inches.

18. The apparatus according to claim 15, wherein a finished sheet has a maximum standard deviation in thickness of about 0.002 inches.

19. Apparatus for slicing a workpiece into relatively thin sheets, each sheet having a thickness, the apparatus comprising:
    (a) a continuous blade band saw having a slicing blade with a cutting edge, and at least two blade guides to stabilize the position of the blade relative to the workpiece, the blade being under a tension of about 7500 psi to about 35000 psi, the blade having a width of from about 2 inches to about 4 inches, the cutting edge comprising from about 2 to about 4 teeth per inch, and the blade having a kerf of from about 0.050 inches to about 0.075 inches, wherein during slicing the blade travels at a linear speed of from about 5000 feet per minute to about 10000 feet per minute;

(b) at least one workpiece support member for supporting the workpiece during slicing; and (c) a workpiece stabilizing member located between the support member and the blade;

whereby, when the workpiece and blade cutting edge are moved toward each other the stabilizing member holds the workpiece firmly in place with respect to the blade at a location just prior to the workpiece firmly in place with respect to the blade at a location just prior to the workpiece entering the blade.

20. The apparatus according to claim 19, wherein the workpiece has a longitudinal axis oriented perpendicular to a direction of blade travel during slicing, and further comprising workpiece guides for maintaining the longitudinal axis of the workpiece in a substantially perpendicular orientation to the direction of blade travel during slicing.

21. The apparatus according to claim 19, wherein the workpiece-stabilizing member comprises at least one set of pinch rollers, the pinch rollers applying a pressure on the workpiece of from about 50 psi to about 100 psi.

22. The apparatus according to claim 19, further comprising a drive wheel and an idler wheel for supporting and driving the blade, each wheel having a diameter of from about 24 inches to about 48 inches.

23. The apparatus according to claim 19, wherein the workpiece is a slab of polymeric material, and wherein a finished sheet has a maximum standard deviation in thickness of about 0.002 inches.

24. Apparatus for slicing a polymeric slab workpiece into relatively thin sheets; the sheets having a thickness, the apparatus comprising:

(a) a continuous blade band saw having a slicing blade with a cutting edge, and at least two blade guides to stabilize the position of the blade relative to the slab, the blade being under a tension of about 7500 psi to about 35000 psi, the blade having a width of from about 2 inches to about 4 inches, the cutting edge comprising from about 2 to about 4 teeth per inch, and the blade having a kerf of from about 0.050 inches to about 0.075 inches, wherein during slicing the blade travels at a linear speed of from about 5000 feet per minute to about 10000 feet per minute;

(b) at least one workpiece support member for supporting the lab during slicing; and (c) at least one set of pinch rollers located between the support member and the blade for stabilizing the position of the slab relative to the blade, the pinch rollers applying a pressure on the slab of from about 50 psi to about 100 psi;

whereby, when the slab is moved toward the blade cutting edge the pinch rollers hold the slab firmly in position with respect to the blade at a location just prior to the slab entering the blade.

25. The apparatus according to claim 24, wherein the workpiece has a longitudinal axis oriented perpendicular to a direction of blade travel during slicing, and further comprising workpiece guides for maintaining the longitudinal axis of the workpiece in a substantially perpendicular orientation to the direction of blade travel during slicing.

26. The apparatus according to claim 24, further comprising a drive wheel and an idler wheel for supporting and driving the blade, each wheel having a diameter of from about 24 inches to about 48 inches.

27. The apparatus according to claim 24, wherein a finished sheet has a maximum standard deviation in thickness of about 0.002 inches.

28. The apparatus according to claim 10, further including a fluid supply for cooling the blade and slab during slicing.

29. The apparatus according to claim 15, further including a fluid supply for cooling the blade and slab during slicing.

30. The apparatus according to claim 19, further including a fluid supply for cooling the blade and slab during slicing.

31. The apparatus according to claim 24, further including a fluid supply for cooling the blade and slab during slicing.

\* \* \* \* \*